(12) United States Patent
Pihlsgård et al.

(10) Patent No.: US 12,257,881 B2
(45) Date of Patent: Mar. 25, 2025

(54) SYSTEM AND METHOD FOR MANAGING A VENTILATION OUTLET

(71) Applicant: Ningbo Geely Automobile Research & Development Co., Ltd., Ningbo (CN)

(72) Inventors: Måns Pihlsgård, Gothenburg (SE); Erik Lindberg Nilsson, Gothenburg (SE)

(73) Assignee: NINGBO GEELY AUTOMOBILE RESEARCH & DEVELOPMENT CO., LTD., Nongbo (CN)

( * ) Notice: Subject to any disclaimer, the term of this patent is extended or adjusted under 35 U.S.C. 154(b) by 506 days.

(21) Appl. No.: 17/307,894

(22) Filed: May 4, 2021

(65) Prior Publication Data
US 2021/0252938 A1    Aug. 19, 2021

Related U.S. Application Data

(63) Continuation of application No. PCT/CN2019/119421, filed on Nov. 19, 2019.

(30) Foreign Application Priority Data

Nov. 26, 2018 (EP) .................... 18208281

(51) Int. Cl.
*B60H 1/00* (2006.01)
*G01S 5/20* (2006.01)

(52) U.S. Cl.
CPC ..... *B60H 1/00757* (2013.01); *B60H 1/00742* (2013.01); *B60H 1/00871* (2013.01); *G01S 5/20* (2013.01)

(58) Field of Classification Search
CPC ............ B60H 1/00757; B60H 1/00742; B60H 1/00871; G01S 5/20
See application file for complete search history.

(56) References Cited

U.S. PATENT DOCUMENTS 6,439,468 B1 * 8/2002 Lambert ............ B60H 1/00757
236/91 C
2011/0074565 A1   3/2011 Cuddihy
2015/0197136 A1   7/2015 Chen
(Continued)

FOREIGN PATENT DOCUMENTS

| CN | 1329228 A | 1/2002 |
|---|---|---|
| CN | 1727911 A | 2/2006 |

(Continued)

OTHER PUBLICATIONS

Machine translation of WO 2018060022 A1 (Year: 2018).*
(Continued)

*Primary Examiner* — Hussein Elchanti
*Assistant Examiner* — Kenneth M Dunne
(74) *Attorney, Agent, or Firm* — Tucker Ellis LLP

(57) ABSTRACT

A system, method and computer program product for managing the flow of air from a ventilation outlet. The method includes determining a position of a sound detected by at least a first microphone determining a ventilation outlet control data based on the position of the sound controlling the air flow of the at least first ventilation outlet based on the ventilation outlet control data for changing at least one of a direction of the air flow, a spread of the air flow and an intensity of the air flow from at least a first ventilation outlet.

6 Claims, 4 Drawing Sheets

(56) References Cited

U.S. PATENT DOCUMENTS

| | | | | |
|---|---|---|---|---|
| 2016/0263966 | A1* | 9/2016 | Livingston | B60H 1/00964 |
| 2017/0323639 | A1* | 11/2017 | Tzirkel-Hancock | B60H 1/00757 |
| 2018/0350355 | A1* | 12/2018 | Amman | G10L 25/51 |

FOREIGN PATENT DOCUMENTS

| | | |
|---|---|---|
| CN | 101191652 A | 6/2008 |
| CN | 101339242 A | 1/2009 |
| CN | 203020181 U | 6/2013 |
| CN | 104908645 A | 9/2015 |
| CN | 105599563 A | 5/2016 |
| CN | 106369773 A | 2/2017 |
| CN | 107396249 A | 11/2017 |
| DE | 102017105980 A1 | 10/2017 |
| GB | 9816593 | 9/1998 |
| JP | 2017121894 A | 7/2017 |
| WO | 2017144792 A1 | 8/2017 |
| WO | WO-2018060022 A1 * | 4/2018 |

OTHER PUBLICATIONS

Swerdlow et al, "Speaker Position Estimation in Vehicles by Means of Acoustic Analysis", 2008, DAGA (Year: 2008).*
Hu et al, "A Robust Statistical-Based Speaker's Location Detection Algorithm in a Vehicular Environment", 2006, EURASIP Journal on Advances in Signal Processing (Year: 2006).*
Sajjanar et al, "A Novel, Cost-Effective and Scalable Helping Aid for the Specially Abled", 2014, International Journal of Scientific & Engineering Research (Year: 2014).*
Scott et al, "Audio Location: Accurate Low-Cost Location Sensing", 2005, Springer, (Year: 2005).*
International Search Report from corresponding International Application No. PCT/CN2019/119421, mailed on Feb. 21, 2020, 2 pages.
Chinese Search Report from corresponding Chinese Application No. 2019800763352, dated Jun. 30, 2023, 6 pages with translation.

* cited by examiner

SYSTEM AND METHOD FOR MANAGING A VENTILATION OUTLET

RELATED APPLICATION DATA

This application is a continuation of International Patent Application No. PCT/CN2019/119421, filed Nov. 19, 2019, which claims the benefit of European Patent Application No. 18208281.8, filed Nov. 26, 2018, the disclosures of which are incorporated herein by reference in their entireties.

TECHNICAL FIELD

The disclosure pertains to the field of managing the flow of air from a ventilation outlet.

BACKGROUND

Most vehicles today are equipped with a vehicle ventilation system for making the climate comfortable for vehicle occupants. The vehicle ventilation system commonly has a number of ventilation outlets in order to make the air in the vehicle compartment warmer or cooler. It is common to have automatic temperature control of the air that flows through the ventilation outlets. Sometimes the flow of air is also controlled automatically by the vehicle ventilation system. It is sometimes desired by a vehicle occupant to control the flow of air so that the air is directed at a certain point or in a certain direction. As an example, during a hot summer day, a vehicle occupant may want to have the flow of air directed to the face in order to cool down. A cold winter day a vehicle occupant may want to have the flow of air directed to the upper chest or in towards the side window. A common solution for controlling the direction of the flow of air from a ventilation outlet is by mechanically adjusting the ventilation outlet by manually using one or more mechanical knobs and/or wheels. Sometimes there is one wheel for directing a left-right direction and one wheel for directing an up-down direction. Some solutions have one knob that controls both left-right and up-down direction of the flow of air from the ventilation outlet. It is also common to control the amount of air that flows through the ventilation outlets by manually turning a wheel or a knob that is closing the ventilation outlet in one end position, i.e. to block the air, and that is fully open in the other end position i.e. to not hinder the any of the air to pass thorough the ventilation outlet. A vehicle occupant often has to use at least one hand to control the ventilation outlet. It is also common to have plural ventilation outlets and then the vehicle occupant needs to manually control each ventilation outlet by hand, e.g. to direct the flow of air in a certain direction.

SUMMARY

There is a demand for an easier way to control a ventilation outlet. Today it is common to manually control ventilation outlets by hand. A vehicle occupant may direct the flow of air, and the amount of air, by hand using wheels and/or knobs that are beside or on each ventilation outlet. There are also electromechanical ventilation outlets that are controlled by use of e.g. electrical motors that sets the direction of the ventilation outlet and the amount of air that passes through the ventilation outlet. Such electromechanical ventilation outlets are often controlled via a user interface of the vehicle, e.g. via touch sensitive display or similar input device.

Independent on if the vehicle occupant has to manually control the ventilation outlet by hand or via a touch sensitive display, the vehicle occupant still needs to pay a certain amount of attention to e.g. look at a touch sensitive display or to look at a ventilation outlet, and sometimes feel with the hand in what direction the air is flowing. This often leads to a further adjustments of the direction of the air flow by another interaction with the touch sensitive display or with the knob and/or wheel of the ventilation outlet. In the case the vehicle occupant is a driver, the attention required for controlling the ventilation outlet is then taken from e.g. the attention to what is happening in the traffic in the surrounding of the vehicle.

An object of the present disclosure is to provide vehicle ventilation control system and method for managing the flow of air from a ventilation outlet which seek to mitigate, alleviate, or eliminate one or more of the above-identified deficiencies in the art and disadvantages singly or in any combination.

The disclosure proposes a vehicle ventilation control system for managing the flow of air from a ventilation outlet. The vehicle ventilation control system comprises at least a first ventilation outlet configured to control the air flow through the at least first ventilation outlet, at least a first microphone configured to detect a sound and a processing circuitry operatively connected to the at least first ventilation outlet and the at least first microphone. The processing circuitry is configured to cause the vehicle ventilation control system to determine a position of the sound detected by the at least first microphone, determine a ventilation outlet control data based on the position of the sound and control the air flow of the at least first ventilation outlet based on the ventilation outlet control data for changing at least one of a direction of the air flow, a spread of the air flow and an intensity of the air flow from at least a first ventilation outlet. This means that the at least first ventilation outlet can be controlled by a detected sound, e.g. changing the direction of the air flow of the at least first ventilation outlet to a position of a sound, where the sound can in one example be a snap of a finger. A vehicle occupant does not need to interact with a user interface or a knob or wheel to control the air flow of the at least first ventilation outlet which requires some attention from the vehicle occupant. The vehicle occupant can instead maintain attention to other matters, such as keeping attention on the surrounding traffic.

According to an aspect the processing circuitry is further configured to cause the vehicle ventilation control system to determine a distance to the position of the sound detected by the at least first microphone. The distance to the position of the sound is useful information to the vehicle ventilation control system when controlling e.g. a spread of the air flow or an intensity of the air flow from at least a first ventilation outlet. For example a short distance can be used to control the at least a first ventilation outlet to have wider spread of the air flow and/or control the first ventilation outlet to have a lower intensity of the air flow.

According to an aspect the vehicle ventilation control system further comprising a second microphone and a third microphone configured to detect a sound. With more microphones the sound can be detected with a higher precision.

According to an aspect the first microphone, the second microphone and the third microphone are connected to the processing circuitry configured to detect the same sound. This means that the microphones can operate together via the processing circuitry in order to detect the same sound. Sound patterns from the different microphones are in one example compared in order to determine the same sound.

According to an aspect the ventilation control system further comprises at least a first ventilation outlet control unit configured to mechanically change the operation of the at least first ventilation outlet and wherein the ventilation outlet control data comprising at least a first control signal configured to be received by the at least first ventilation outlet control unit to cause a mechanical change of the at least first ventilation outlet to change of at least one of a direction of the air flow, a spread of the air flow, an intensity of the air flow from at least a first ventilation outlet. This means that e.g. a vehicle occupant does not need to mechanically change the operation of the at least first ventilation outlet by hand, instead the at least first ventilation outlet control unit causes a mechanical change of the at least first ventilation outlet, by e.g. electrical motors, and the at least first control signal in one example comprises information regarding settings of a direction of the at least first ventilation outlet.

According to an aspect the processing circuitry is configured to determine the position of the sound by a triangulation operation by comparing a first time when the sound is detected by the first microphone with a second time when the sound is detected by the second microphone and with a third time when the sound is detected by the third microphone. This means that the position of the sound can be established relative to the position of the microphones. With knowledge of where the microphones are installed in the vehicle, the processing circuitry can determine the position of the sound in the vehicle for managing the flow of air from at least a first ventilation outlet.

According to an aspect the processing circuitry is further configured to cause the vehicle ventilation control system to determine and identify a sound with a specific sound pattern. With the knowledge of a certain sound, for example the sound of snapping fingers, the vehicle ventilation control system will in one example operate when the specific sound is determined and not operate in response to detecting any other sound such as clapping hands, or whistling. This enhances the user experience for the vehicle occupant.

According to an aspect the processing circuitry is further configured to cause the vehicle ventilation control system to determine the number of times the sound with the specific sound pattern occurs in order to control the operation of the at least first ventilation outlet. This enables different operation of the vehicle ventilation control system dependent on the number of times the sound with the specific sound pattern occurs.

According to an aspect the processing circuitry is further configured to determine the number of times the sound with the specific sound pattern occurs and in accordance with a determination that the sound with the specific sound pattern occurs a first number of times, controlling a first set of ventilation outlets comprising at least one ventilation outlet to direct the air flow to a certain direction, and in accordance with a determination that the detected sound with the specific sound pattern occurs a second number of times that is different from the first number of times, controlling the first set of ventilation outlets and at least a second set of ventilation outlets comprising at least one ventilation outlet to direct the air flow from the first set of ventilation outlets and from the second set of ventilation outlets respectively to a certain direction. This means that if the sound with the specific sound pattern occurs a first number of times, e.g. one time, one or more ventilation outlets are controlled and the detected sound with the specific sound pattern occurs a second number of times that is different from the first number of times, e.g. two times, one or more further ventilation outlets are controlled. It may for example be desired to limit the number of ventilation outlets that are controlled if e.g. there are more than one vehicle occupant in the vehicle.

The disclosure further proposes a method for managing the flow of air from a ventilation outlet. The method comprising the steps of determining a position of a sound detected by at least a first microphone, determining a ventilation outlet control data based on the position of the sound, and the step of controlling the air flow of the at least first ventilation outlet based on the ventilation outlet control data for changing at least one of a direction of the air flow, a spread of the air flow and an intensity of the air flow from at least a first ventilation outlet. This means that the at least first ventilation outlet can be controlled by a detected sound, e.g. changing the direction of the air flow of the at least first ventilation outlet to a position of a sound, where the sound can in one example be a snap of a finger. A vehicle occupant does not need to interact with a user interface or a knob or wheel to control the air flow of the at least first ventilation outlet which require some attention from the vehicle occupant. The vehicle occupant can instead maintain attention to other matters, such as keeping attention on the surrounding traffic.

According to an aspect the method further comprising the step of determining a distance to the position of the sound detected by the at least first microphone. The distance to the position of the sound is useful information to the vehicle ventilation control system when controlling e.g. a spread of the air flow or an intensity of the air flow from at least a first ventilation outlet. For example a short distance can be used to control the at least a first ventilation outlet to have wider spread of the air flow and/or control the first ventilation outlet to have a lower intensity of the air flow.

According to an aspect the method further comprising the step of determining and identifying a sound with a specific sound pattern. With the knowledge of a certain sound, for example the sound of snapping fingers, the vehicle ventilation control system will in one example operate when the specific sound is determined and not operate in response to detecting any other sound such as clapping hands, or whistling. This enhances the user experience for the vehicle occupant.

According to an aspect the method further comprising the step of determining the number of times the sound with the specific sound pattern occurs in order to control the operation of the at least first ventilation outlet. This enables different operation of the vehicle ventilation control system dependent on the number of times the sound with the specific sound pattern occurs.

According to an aspect, in accordance with a determination that the sound with the specific sound pattern occurs a first number of times, controlling a first set of ventilation outlets comprising at least one ventilation outlet to direct the air flow to a certain direction, and in accordance with a determination that the detected sound with the specific sound pattern occurs a second number of times that is different from the first number of times, controlling the first set of ventilation outlets and at least a second set of ventilation outlets comprising at least one ventilation outlet to direct the air flow from the first set of ventilation outlets and from the second set of ventilation outlets respectively to a certain direction. This means that if the sound with the specific sound pattern occurs a first number of times, e.g. one time, one or more ventilation outlets are controlled and the detected sound with the specific sound pattern occurs a second number of times that is different from the first number of times, e.g. two times, one or more further ventilation outlets are controlled. It may for example be desired to limit the number of ventilation outlets that are controlled if e.g. there are more than one vehicle occupant in the vehicle.

The disclosure further proposes a computer program product comprising a non-transitory computer readable medium, having thereon a computer program comprising program instructions, the computer program being loadable into a processing circuitry and configured to cause execution of the method when the computer program is run by the at least one processing circuitry.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
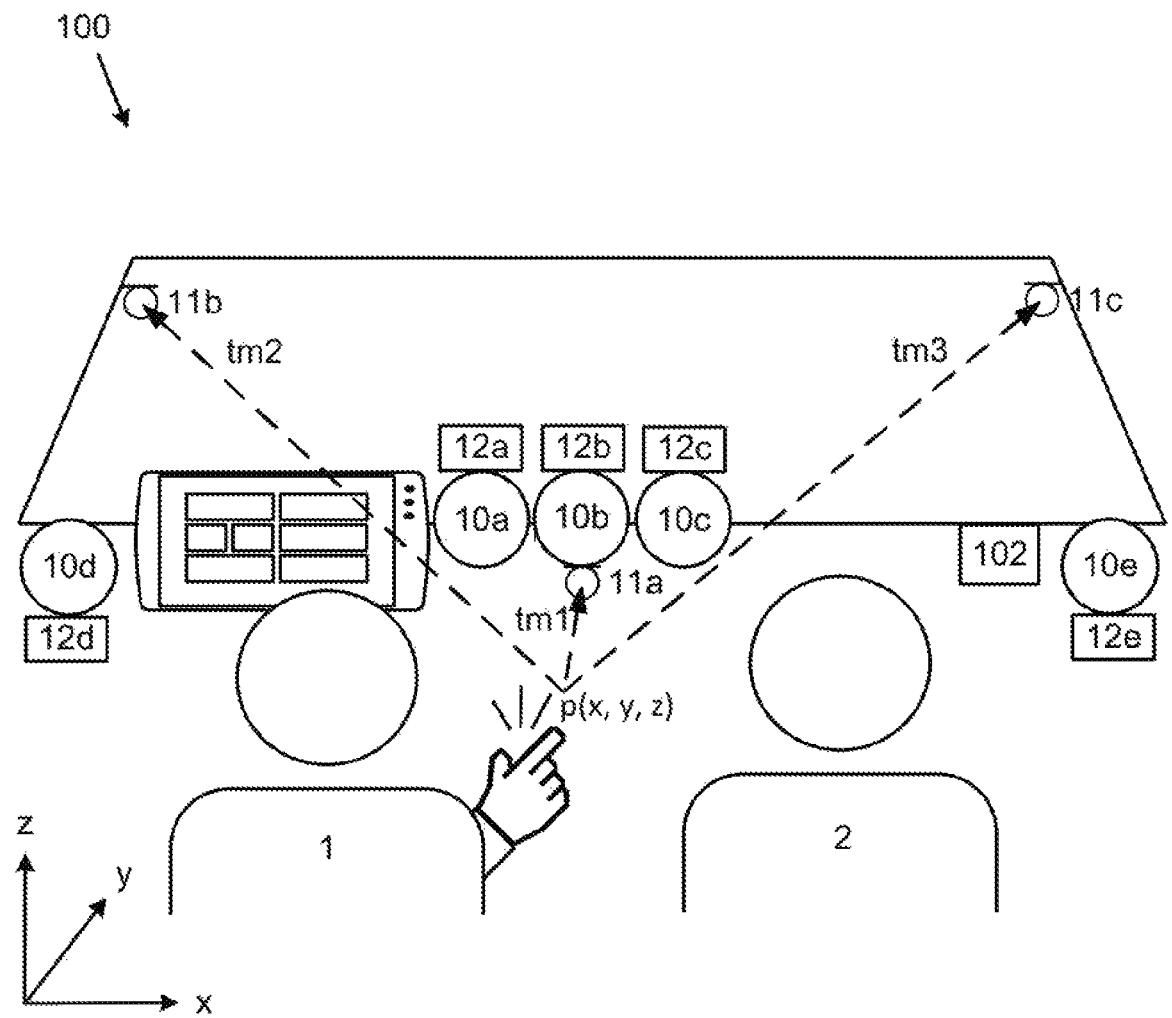
FIG. 1 illustrates a vehicle ventilation control system according to an aspect of the disclosure.

Aspects of the present disclosure will be described more fully hereinafter with reference to the accompanying drawings. The method and device disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Today it is very common to manually control ventilation outlets by hand. A vehicle occupant may direct the flow of air, and the amount of air, by hand using wheels and/or knobs that are beside or on each ventilation outlet. There are also electromechanical ventilation outlets that are controlled by use of e.g. electrical motors that sets the direction of the ventilation outlet and the amount of air that passes through the ventilation outlet. Such electromechanical ventilation outlets are often controlled via a user interface of the vehicle, e.g. via touch sensitive display or similar input device.

Independent on if the vehicle occupant has to manually control the ventilation outlet by hand or via a touch sensitive display, the vehicle occupant still needs to pay a certain amount of attention to e.g. look at a touch sensitive display or to look at a ventilation outlet, and sometimes feel with the hand in what direction the air is flowing.

This often leads to a further adjustment of the direction of the air flow by another interaction with the touch sensitive display or with the knob and/or wheel of the ventilation outlet. In the case the vehicle occupant is a driver, the attention required for controlling the ventilation outlet is then taken from e.g. the attention to what is happening in the traffic in the surrounding of the vehicle. There is hence a demand for an easier way to control a ventilation outlet.

An object of the present disclosure is to provide vehicle ventilation control system and method for managing the flow of air from a ventilation outlet which seek to mitigate, alleviate, or eliminate one or more of the above-identified deficiencies in the art and disadvantages singly or in any combination. The disclosure will now be described in more detail with reference to illustrations in the Figures.

The disclosure proposes a vehicle ventilation control system 100 for managing the flow of air from a ventilation outlet.

FIG. 1 illustrates the vehicle ventilation control system 100 that comprises at least a first ventilation outlet 10a, 10b, 10c, 10d, 10e configured to control the air flow through the at least first ventilation outlet 10a, 10b, 10c, 10d, 10e. The purpose of a ventilation outlet 10a, 10b, 10c, 10d, 10e is typically to keep the atmosphere in the vehicle compartment, or sometimes in plural vehicle compartments, pleasant by providing fresh air that is sometimes heated or cooled dependent on a desired vehicle compartment temperature setting. Ventilation outlets 10a, 10b, 10c, 10d, 10e are also used for keep windows clean form mist. There are different kinds of ventilation outlets 10a, 10b, 10c, 10d, 10e. According to an aspect the ventilation outlet 10a, 10b, 10c, 10d, 10e is facing a vehicle occupant configured to provide a flow of air onto a vehicle occupant. According to an aspect the ventilation outlet 10a, 10b, 10c, 10d, 10e is configured to face a certain part of a vehicle compartment or a window.

Figure 3A:
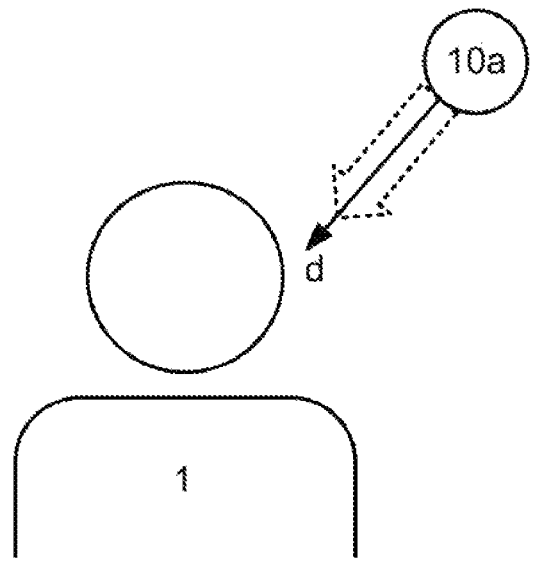
FIG. 3A and FIG. 3B illustrates a vehicle ventilation control system when controlling an intensity of the air flow from at least a first ventilation outlet according to an aspect of the disclosure.
Figure 3B:
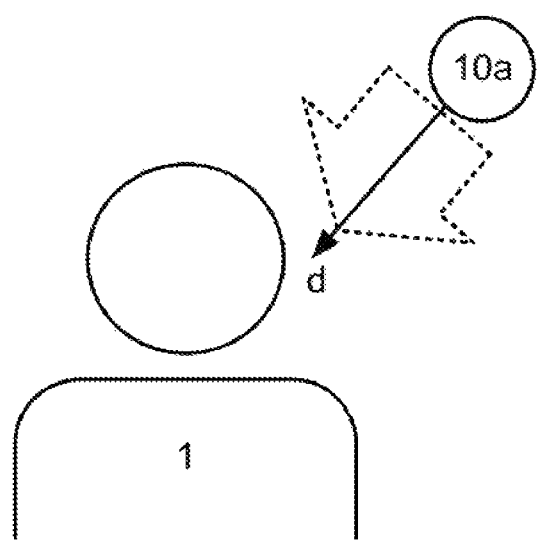

According to an aspect the ventilation outlet 10a, 10b, 10c, 10d, 10e is configured with a fan that regulates the intensity of air flow from the ventilation outlet 10a, 10b, 10c, 10d, 10e. According to an aspect the fan is driven by an electrical motor that is configured to adjust the speed of the fan for regulating the intensity of air flow. In one example the ventilation outlet 10a, 10b, 10c, 10d, 10e is adjusted to generate a low intensity of air flow from the ventilation outlet 10a as illustrated in FIG. 3A. In one example the ventilation outlet 10a, 10b, 10c, 10d, 10e is adjusted to generate a high intensity of air flow from the ventilation outlet 10a as illustrated in FIG. 3B.

Figure 4A:
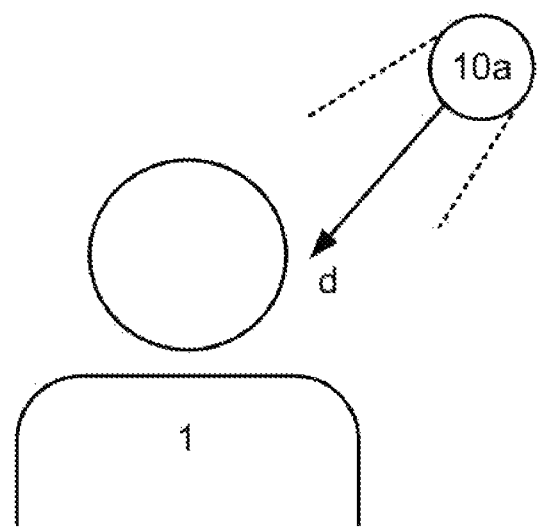
FIG. 4A and FIG. 4B illustrates a vehicle ventilation control system when controlling a spread of the air flow from at least a first ventilation outlet according to an aspect of the disclosure.
Figure 4B:
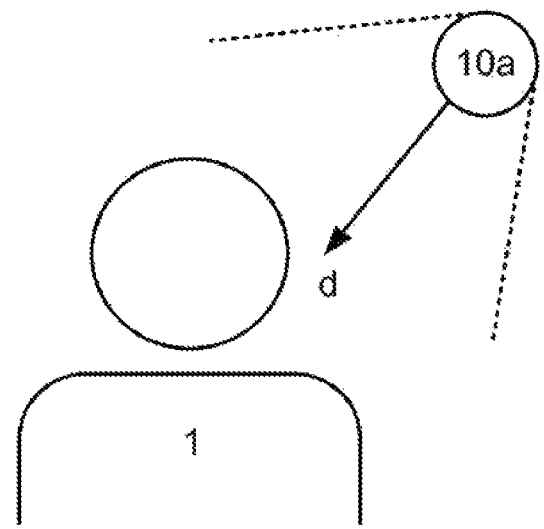

According to an aspect the ventilation outlet 10a, 10b, 10c, 10d, 10e is configured to regulate the spread of the air flow from the ventilation outlet 10a, 10b, 10c, 10d, 10e by movement of mechanical members in the ventilation outlet 10a, 10b, 10c, 10d, 10e. In one example ventilation outlet 10a, 10b, 10c, 10d, 10e is adjusted to generate a narrow spread of the air flow from the ventilation outlet 10a, 10b, 10c, 10d, 10e as illustrated in FIG. 4A. In one example ventilation outlet 10a, 10b, 10c, 10d, 10e is adjusted to generate a wide spread of the air flow from the ventilation outlet 10a, 10b, 10c, 10d, 10e as illustrated in FIG. 4B. This is commonly referred to as regulating the cone of the air flow from the ventilation outlet 10a, 10b, 10c, 10d, 10e.

A ventilation outlet 10a, 10b, 10c, 10d, 10e is typically placed in front of a vehicle occupant. In one example there are ventilation outlets 10a, 10b, 10c, 10d, 10e in the front row of the vehicle for e.g. a driver and a passenger, however ventilation outlets 10a, 10b, 10c, 10d, 10e can be placed in any back row of the vehicle for the passengers in the backseat or backseats.

According to an aspect, as illustrated in FIG. 1, the ventilation outlets 10a, 10b, 10c, 10d, 10e are placed in front of a driver and a passenger in the front row. In FIG. 1 the ventilation outlets 10a, 10b, 10c, 10d, 10e are configured to be directed to the driver and/or the passenger.

The vehicle ventilation control system 100 further comprises at least a first microphone 11a, 11b, 11c configured to detect a sound. According to an aspect the at least first microphone 11a, 11b, 11c is placed at a predefined location in the vehicle compartment. According to an aspect the at least a first microphone 11a, 11b, 11c is placed at a predefined location in the vehicle compartment during manufacture of the vehicle. In one example the at least first microphone 11a, 11b, 11c is placed in front of a vehicle occupant so that the at least first microphone 11a, 11b, 11c is configured to detect a sound from the vehicle occupant. In one example the at least first microphone 11a, 11b, 11c is used for multiple purposes such as noise canceling, safety recording, voice control, conference call, voice recognition etc.

The vehicle ventilation control system 100 further comprises a processing circuitry 102 operatively connected to the at least first ventilation outlet 10a, 10b, 10c and the at least first microphone 11a, 11b, 11c. According to an aspect the processing circuitry 102 is a central processing unit of the vehicle. According to an aspect the processing circuitry 102 is a dedicated central processing unit for the vehicle ventilation control system 100.

The processing circuitry 102 is configured to cause the vehicle ventilation control system 100 to determine a position of the sound p(x, y, z) detected by the at least first microphone 11a, 11b, 11c. According to an aspect the position of the sound p(x, y, z) is defined by three dimensional coordinates (x, y, z) in the vehicle compartment space. According to an aspect the position of the sound p(x, y, z) is a defined volume. According to an aspect the position of the sound p(x, y, z) is a position within a defined volume. According to an aspect the position of the sound p(x, y, z) is determined by the at least first microphone 11a, 11b, 11c. In FIG. 1 the position of the sound p(x, y, z) is illustrated with a position of snapping fingers of the vehicle occupant, illustrated as the driver in FIG. 1. When the driver is snapping fingers a sound is generated that is detected by the at least first microphone 11a, 11b, 11c.

The processing circuitry 102 is configured to cause the vehicle ventilation control system 100 to determine a ventilation outlet control data based on the position of the sound p(x, y, z). According to an aspect the position of the sound p(x, y, z) is determined in relation to the position of the at least first ventilation outlet 10a, 10b, 10c, 10d, 10e. With knowledge of the static position of the at least first ventilation outlet 10a, 10b, 10c, 10d, 10e in relation to the dynamic position of the sound p(x, y, z) a ventilation outlet control data can be determined. According to an aspect the a ventilation outlet control data comprising data defining the position of the sound p(x, y, z) in relation to the position of the at least first ventilation outlet 10a, 10b, 10c, 10d, 10e. According to an aspect the ventilation outlet control data comprising data defining at least one of the direction of the air flow d, a spread of the air flow and an intensity of the air flow from the at least first ventilation outlet 10a, 10b, 10c, 10d, 10e.

According to an aspect the vehicle ventilation control system 100 further comprises a memory. According to an aspect the memory is operatively connected to the processing circuitry 102. According to an aspect the memory comprises data describing the position of the at least first ventilation outlet 10a, 10b, 10c, 10d, 10e. In one example when manufactured, the vehicle is programmed with data that is stored in the memory comprising data describing the position of the at least first ventilation outlet 10a, 10b, 10c, 10d, 10e.

The processing circuitry 102 is configured to cause the vehicle ventilation control system 100 to control the air flow of the at least first ventilation outlet 10a, 10b, 10c, 10d, 10e based on the ventilation outlet control data for changing at least one of a direction of the air flow d, a spread of the air flow and an intensity of the air flow from at least a first ventilation outlet 10a, 10b, 10c, 10d, 10e. This means that the at least first ventilation outlet 10a, 10b, 10c, 10d, 10e can be controlled by a detected sound, e.g. changing the direction of the air flow of the at least first ventilation outlet 10a, 10b, 10c, 10d, 10e to a position of a sound, where the sound can in one example be a snap of a finger. A vehicle occupant does not need to interact with a user interface or a knob or wheel to control the air flow of the at least first ventilation outlet 10a, 10b, 10c, 10d, 10e which require some attention from the vehicle occupant. The vehicle occupant can instead maintain attention to other matters, such as keeping attention on the surrounding traffic.

According to an aspect the processing circuitry 102 is further configured to cause the vehicle ventilation control system 100 to determine a distance L to the position of the sound p(x, y, z) detected by the at least first microphone 11a, 11b, 11c. In one example the at least first microphone 11a, 11b, 11c detects a sound and depending on the character of the sound, i.e. the amplitude of the detected sound, a distance L to the position of the sound p(x, y, z) can be determined. The distance L to the position of the sound p(x, y, z) is useful information to the vehicle ventilation control system 100 when controlling e.g. a spread of the air flow or an intensity of the air flow from at least a first ventilation outlet 10a, 10b, 10c, 10d, 10e. For example a short distance L can be used to control the at least a first ventilation outlet 10a, 10b, 10c, 10d, 10e to have wider spread of the air flow and/or control the first ventilation outlet 10a, 10b, 10c, 10d, 10e to have a lower intensity of the air flow. According to an aspect the distance L is determined in order to determine if a first set of ventilation outlets comprising at least one ventilation outlet 10a, 10b, 10c, 10d, 10e is to be controlled by the detected sound or of a second set of ventilation outlets comprising at least one ventilation outlet 10a, 10b, 10c, 10d, 10e is to be controlled by the detected sound. In one example a plurality of sets of ventilation outlets can be present in the same vehicle. In one example a first and a second set of ventilation outlets are in the front of the vehicle, while a third set of ventilation outlets is in the back of the vehicle in any back row of the vehicle.

According to an aspect the vehicle ventilation control system 100 further comprising a second microphone 11b and a third microphone 11c configured to detect a sound. With more microphones the sound can be detected with a higher precision. According to an aspect, as illustrated in FIG. 1, the ventilation control system 100 comprises a first microphone 11a, a second microphone 11b and a third microphone 11c. According to an aspect the microphones are placed at least a predefined distance from each other in the vehicle compartment. In the example illustrated in FIG. 1, the first microphone 11a is placed in the dash board below the ventilation outlet 10b, the second microphone 11b is placed in the upper left corner of the windshield, and the third microphone 11c is placed in the upper right corner of the windshield. According to an aspect the position of the sound p(x, y, z) is determined by the first microphone 11a, the second microphone 11b and the third microphone 11c.

According to an aspect the first microphone 11a, the second microphone 11b and the third microphone 11c are connected to the processing circuitry 102 configured to detect the same sound. This means that the microphones can operate together via the processing circuitry 102 in order to detect the same sound. Sound patterns from the different microphones are in one example compared in order to determine the same sound.

According to an aspect the processing circuitry 102 is further configured to cause the vehicle ventilation control system 100 to determine and identify a sound with a specific sound pattern. According to an aspect the specific sound pattern is the sound pattern of a snapping finger. According to an aspect the specific sound pattern is the sound pattern of snapping fingers. In an example a finger is snapped by the vehicle occupant using one hand. According to an aspect the specific sound pattern is the sound pattern of a clapping hand or clapping hands. According to an aspect the specific sound pattern is the sound pattern of a knocking sound. In an example the knocking sound is generated by e.g. knocking or hitting of a part of the interior of the vehicle by the vehicle occupant. According to an aspect the specific sound pattern is the sound pattern of a scratching sound. In an example the scratching sound is generated by scratching of a part of the interior of the vehicle by the vehicle occupant. According to an aspect the specific sound pattern is the sound pattern of a rhythmic sound. In an example the rhythmic sound is at least any of a repeated sound, a sequence of sounds or a certain number of repeated sounds. An advantage with a sound generated by a hand of the vehicle occupant is that the position of the sound p(x, y, z) can be at a position that is away from the vehicle occupant. In an example the position of the sound p(x, y, z) can then be a location where the vehicle occupants desires to control the air flow of the at least first ventilation outlet 10a, 10b, 10c, 10d, 10e to. In an example the vehicle occupant can knock at the side window, e.g. to generate a rhythmic sound, in order to control the air flow of the at least first ventilation outlet 10a, 10b, 10c, 10d, 10 to the side window. In an example the vehicle occupant can scratch on the passenger seat in order to control the air flow of the at least first ventilation outlet 10a, 10b, 10c, 10d, 10 to the passenger seat. In an example the vehicle occupant can clap a hand to the upper inner interior surface of the vehicle in order to control the air flow of the at least first ventilation outlet 10a, 10b, 10c, 10d, 10 to the upper inner interior surface of the vehicle.

With the knowledge of a certain sound, for example the sound of snapping fingers, the vehicle ventilation control system 100 will in one example operate when the specific sound is determined and not operate in response to detecting any other sound such as clapping hands, or whistling. This enhances the user experience for the vehicle occupant. According to an aspect the sound detected by the first microphone 11a, the second microphone 11b and the third microphone 11c is defined by a sound pattern from each of the first microphone 11a, the second microphone 11b and the third microphone 11c. According to an aspect the sound pattern from each of the first microphone 11a, the second microphone 11b and the third microphone 11c are compared to determine that it is the same sound that detected by each of the first microphone 11a, the second microphone 11b and the third microphone 11c. According to an aspect the sound pattern is described by a function dependent on the frequency of the sound and the amplitude of the sound over time.

According to an aspect, as illustrated in FIG. 1, the ventilation control system 100 further comprises at least a first ventilation outlet control unit 12a, 12b, 12c, 12d, 12e configured to mechanically change the operation of the at least first ventilation outlet 10a, 10b, 10c, 10d, 10e and wherein the ventilation outlet control data comprising at least a first control signal configured to be received by the at least first ventilation outlet control unit 12a, 12b, 12c, 12d, 12e to cause a mechanical change of the at least first ventilation outlet 10a, 10b, 10c, 10d, 10e to change of at least one of a direction of the air flow, a spread of the air flow, an intensity of the air flow from at least a first ventilation outlet 10a, 10b, 10c, 10d, 10e.

According to an aspect the least first ventilation outlet control unit 12a, 12b, 12c, 12d, 12e is configured to mechanically change the operation of the at least first ventilation outlet 10a, 10b, 10c, 10d, 10e by movement of mechanical members. According to an aspect the least first ventilation outlet control unit 12a, 12b, 12c, 12d, 12e is configured to mechanically change the operation of the at least first ventilation outlet 10a, 10b, 10c, 10d, 10e by any of at least one of a electric motor, an electrically controlled memory metal, a temperature controlled memory metal, a Micro-Electro-Mechanical System, a pneumatic control member or air pressure.

According to an aspect the ventilation outlet control data comprising at least a first control signal comprising a predefined parameter setting configured to mechanically change the operation of the at least first ventilation outlet 10a, 10b, 10c, 10d, 10e. According to an aspect the ventilation outlet control data comprising at least a first control signal for directing the at least first ventilation outlet 10a, 10b, 10c, 10d, 10e to a predefined position that is dependent on the position of the sound p(x, y, z). According to an aspect the ventilation outlet control data comprising at least a first control signal comprising the position of the sound p(x, y, z).

This means that e.g. a vehicle occupant does not need to mechanically change the operation of the at least first ventilation outlet 10a, 10b, 10c, 10d, 10e by hand, instead the at least first ventilation outlet control unit 12a, 12b, 12c, 12d, 12e causes a mechanical change of the at least first ventilation outlet 10a, 10b, 10c, 10d, 10e, by e.g. electrical motors, and the at least first control signal in one example comprises information regarding settings of a direction of the at least first ventilation outlet 10a, 10b, 10c, 10d, 10e.

According to an aspect, as illustrated in FIG. 1, the processing circuitry 102 is configured to determine the position of the sound p(x, y, z) by a triangulation operation by comparing a first time tm1 when the sound is detected by the first microphone 11a with a second time tm2 when the sound is detected by the second microphone 11b and with a third time tm3 when the sound is detected by the third microphone 11c. According to an aspect the triangulation operation comprising comparing a first time tm1 when the sound is detected by the first microphone 11a at a known first microphone position, with a second time tm2 when the sound is detected by the second microphone 11b at a known second microphone position and with a third time tm3 when the sound is detected by the third microphone 11c at a known third microphone position and determining a relative position of the sound p(x, y, z) in a three dimensional space of the vehicle compartment relative to the positions of the microphones. According to an aspect the triangulation operation further comprising determining the position of the sound p(x, y, z) by using a predetermined speed of sound in meters per second. In one example the speed of sound is dependent on the temperature and/or the humidity of the air in the vehicle compartment. In one example the speed of sound at 20 C is 343 meters per second.

This means that the position of the sound p(x, y, z) can be established relative to the position of the microphones 11a, 11b, 11c. With knowledge of where the microphones 11a, 11b, 11c are installed in the vehicle, the processing circuitry 102 can determine the position of the sound p(x, y, z) in the vehicle for managing the flow of air from at least a first ventilation outlet 10a, 10b, 10c, 10d, 10e. According to an aspect the first microphone 11a the second microphone 11b and the third microphone 11c are placed at predefined locations in the vehicle compartment during manufacture of the vehicle.

According to an aspect the processing circuitry 102 is further configured to cause the vehicle ventilation control system 100 to determine the number of times the sound with the specific sound pattern occurs in order to control the operation of the at least first ventilation outlet 10a, 10b, 10c, 10d, 10e. This enables different operation of the vehicle ventilation control system 100 dependent on the number of times the sound with the specific sound pattern occurs. In one example the number of times the number of times the sound with the specific sound pattern occurs controls at least of the direction of the air flow, a spread of the air flow and an intensity of the air flow from at least a first ventilation outlet 10a, 10b, 10c, 10d, 10e.

In an example if the sound with the specific sound pattern occurs a first number of times the direction of the air flow from at least a first ventilation outlet 10a, 10b, 10c, 10d, 10e is controlled.

In an example if the sound with the specific sound pattern occurs a second number of times the spread of the air flow of at least a first ventilation outlet 10a, 10b, 10c, 10d, 10e is controlled.

In an example if the sound with the specific sound pattern occurs a third number of times the intensity of the air flow of at least a first ventilation outlet 10a, 10b, 10c, 10d, 10e is controlled.

Figure 2A:
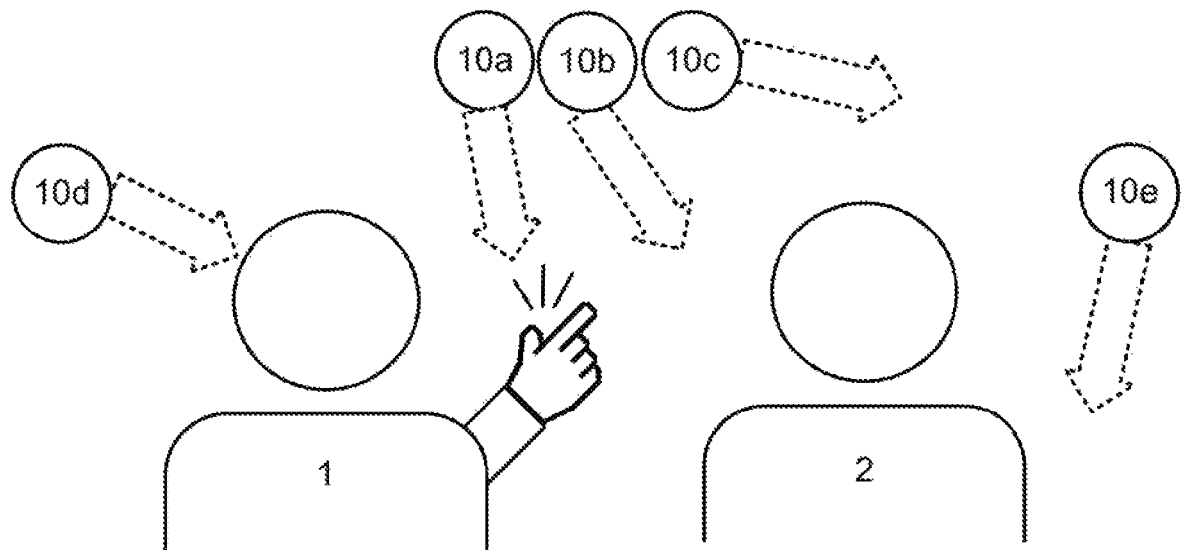
FIG. 2A illustrates a vehicle ventilation control system when determining that the sound with the specific sound pattern occurs a first number of times and controlling a first set of ventilation outlets according to an aspect of the disclosure.
Figure 2B:
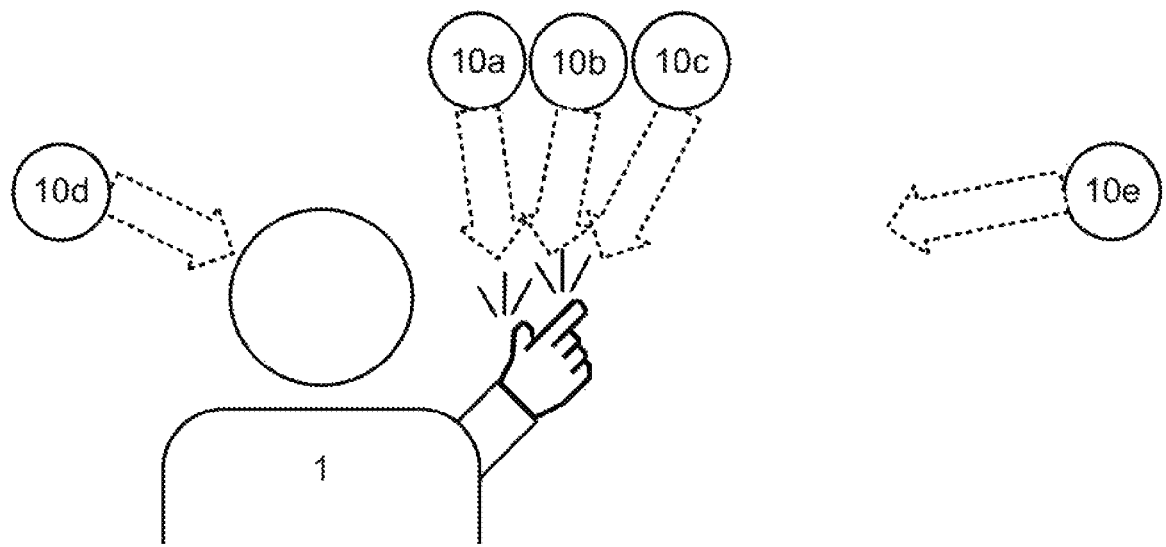
FIG. 2B illustrates a vehicle ventilation control system when determining that the sound with the specific sound pattern occurs a second number of times that is different from the first number of times and controlling the first set of ventilation outlets and at least a second set of ventilation outlets according to an aspect of the disclosure.

According to an aspect, and as illustrated in FIG. 2A and FIG. 2B, the processing circuitry 102 is further configured to determine the number of times the sound with the specific sound pattern occurs and in accordance with a determination that the sound with the specific sound pattern occurs a first number of times, controlling a first set of ventilation outlets comprising at least one ventilation outlet 10a, 10d to direct the air flow to a certain direction, and in accordance with a determination that the detected sound with the specific sound pattern occurs a second number of times that is different from the first number of times, controlling the first set of ventilation outlets 10a, 10d and at least a second set of ventilation outlets comprising at least one ventilation outlet 10b, 10c, 10e to direct the air flow from the first set of ventilation outlets 10a, 10d and from the second set of ventilation outlets 10b, 10c, 10e respectively to a certain direction. In the illustration in FIG. 2A there are two vehicle occupants in the vehicle. In the illustrative example in FIG. 2A the first vehicle occupant 1, e.g. the driver, respects that the second vehicle occupant 2 may want to have e.g. at least one ventilation outlet directed towards the second vehicle occupant 2. The first vehicle occupant 1 is in the example just snapping fingers once in order to control the direction of the first set of ventilation outlets to direct the air flow to a certain direction where the first vehicle occupant 1 wants the air flow, but this will not change the direction of the air flow of the second set of ventilation outlets. In the example illustrated in FIG. 2B, the first vehicle occupant 1, e.g. the driver, is alone in the vehicle. In this example the first vehicle occupant 1 desires that both the first set of ventilation outlets 10a, 10d and the second set of ventilation outlets 10b, 10c, 10e directs the air flow to a certain direction where the first vehicle occupant 1 wants the air flow, and by snapping fingers twice, the first vehicle occupant 1 can control both the first set of ventilation outlets 10a, 10d and the second set of ventilation outlets 10b, 10c, 10e.

This means that if the sound with the specific sound pattern occurs a first number of times, e.g. one time, one or more ventilation outlets are controlled and the detected sound with the specific sound pattern occurs a second number of times that is different from the first number of times, e.g. two times, one or more further ventilation outlets are controlled. It may for example be desired to limit the number of ventilation outlets that are controlled if e.g. there are more than one vehicle occupant in the vehicle as illustrated in FIG. 2A.

Figure 5:
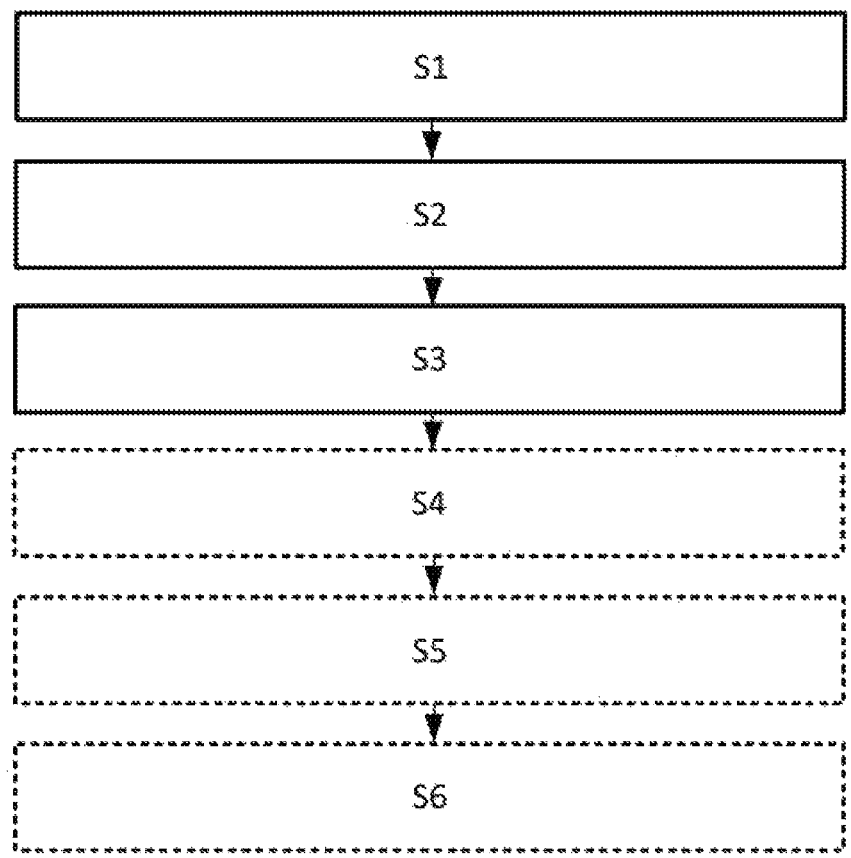
FIG. 5 illustrates a flow chart of the method steps according to some aspects of the disclosure.

The disclosure further proposes a method, as illustrated in FIG. 5, for managing the flow of air from a ventilation outlet 10a, 10b, 10c, 10d, 10e. The method comprising the steps of S1 determining a position of a sound p(x, y, z) detected by at least a first microphone 11a, 11b, 11c, S2 determining a ventilation outlet control data based on the position of the sound p(x, y, z), and the step of S3 controlling the air flow of the at least first ventilation outlet 10a, 10b, 10c, 10d, 10e based on the ventilation outlet control data for changing at least one of a direction of the air flow d, a spread of the air flow and an intensity of the air flow from at least a first ventilation outlet 10a, 10b, 10c, 10d, 10e. This means that the at least first ventilation outlet 10a, 10b, 10c, 10d, 10e can be controlled by a detected sound, e.g. changing the direction of the air flow of the at least first ventilation outlet 10a, 10b, 10c, 10d, 10e to a position of a sound, where the sound can in one example be a snap of a finger. A vehicle occupant does not need to interact with a user interface or a knob or wheel to control the air flow of the at least first ventilation outlet 10a, 10b, 10c, 10d, 10e which require some attention from the vehicle occupant. The vehicle occupant can instead maintain attention to other matters, such as keeping attention on the surrounding traffic.

According to an aspect the method, as illustrated in FIG. 5, further comprising the step of S4 determining a distance L to the position of the sound p(x, y, z) detected by the at least first microphone 11a, 11b, 11c. The distance L to the position of the sound p(x, y, z) is useful information to the vehicle ventilation control system 100 when controlling e.g. a spread of the air flow or an intensity of the air flow from at least a first ventilation outlet 10a, 10b, 10c, 10d, 10e. For example a short distance L can be used to control the at least a first ventilation outlet 10a, 10b, 10c, 10d, 10e to have wider spread of the air flow and/or control the first ventilation outlet 10a, 10b, 10c, 10d, 10e to have a lower intensity of the air flow.

According to an aspect the method, as illustrated in FIG. 5, further comprising the step of S5 determining and identifying a sound with a specific sound pattern. With the knowledge of a certain sound, for example the sound of snapping fingers, the vehicle ventilation control system 100 will in one example operate when the specific sound is determined and not operate in response to detecting any other sound such as clapping hands, or whistling. This enhances the user experience for the vehicle occupant.

According to an aspect the method, as illustrated in FIG. 5, further comprising the step of S6 determining the number of times the sound with the specific sound pattern occurs in order to control the operation of the at least first ventilation outlet 10a, 10b, 10c, 10d, 10e. This enables different operation of the vehicle ventilation control system 100 dependent on the number of times the sound with the specific sound pattern occurs.

According to an aspect, in accordance with a determination that the sound with the specific sound pattern occurs a first number of times, controlling a first set of ventilation outlets comprising at least one ventilation outlet 10a, 10d to direct the air flow to a certain direction, and in accordance with a determination that the detected sound with the specific sound pattern occurs a second number of times that is different from the first number of times, controlling the first set of ventilation outlets 10a, 10d and at least a second set of ventilation outlets comprising at least one ventilation outlet 10b, 10c, 10e to direct the air flow from the first set of ventilation outlets 10a, 10d and from the second set of ventilation outlets 10b, 10c, 10e respectively to a certain direction. This means that if the sound with the specific sound pattern occurs a first number of times, e.g. one time, one or more ventilation outlets are controlled and the detected sound with the specific sound pattern occurs a second number of times that is different from the first number of times, e.g. two times, one or more further ventilation outlets are controlled. It may for example be desired to limit the number of ventilation outlets that are controlled if e.g. there are more than one vehicle occupant in the vehicle.

According to an aspect the sound with the specific sound pattern is any of, a speech, a clap, a lip smack or a whistle. According to an aspect the sound with the specific sound pattern is a spoken word, plural words, a sequence of sounds or a supersonic sound. According to an aspect the sound with the specific sound pattern is a combination of at least two different sounds. According to an aspect the sound with the specific sound pattern is a combination of speech followed by a snapping finger. According to an aspect the sound with the specific sound pattern is a sound or combination of sounds.

Figure 6:
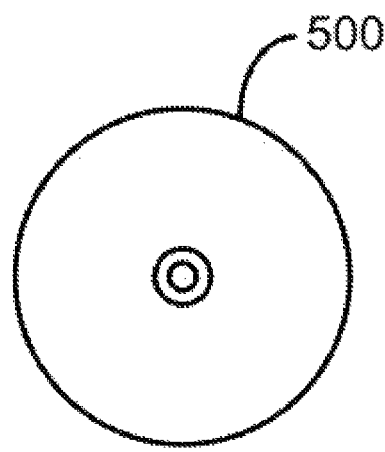
FIG. 6 illustrates a computer program product according to some aspects of the disclosure.

The disclosure further proposes, as illustrated in FIG. 6, a computer program product 500 comprising a non-transitory computer readable medium, having thereon a computer program comprising program instructions, the computer program being loadable into a processing circuitry 102 and configured to cause execution of the method when the computer program is run by the at least one processing circuitry 102.

According to an aspect the key localization system 100 is configured to carry out any or more of the aspects of the described method. According to an aspect of the disclosure, the method is carried out by instructions in a software program that is downloaded and run in the vehicle ventilation control system 100.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A vehicle ventilation control system for managing an air flow in a vehicle, the vehicle ventilation control system comprising:
    a ventilation outlet configured to control air flow through the ventilation outlet;
    at least a first microphone configured to detect sound; and
    a processing circuitry operatively connected to the ventilation outlet and the at least first microphone, the processing circuitry configured to cause the vehicle ventilation control system to:
    identify a snapping sound made by a single snap of a vehicle occupant's fingers, and determine a position of the snapping sound relative to the ventilation outlet;
    determine a ventilation outlet control data based on the position of the snapping sound, wherein the determination of the ventilation outlet control data and the determination of the position of the snapping sound is based on the identified snapping sound, and wherein the ventilation outlet control data includes control data to control a direction of the air flow and to control at least one of a spread of the air flow or an intensity of the air flow from the ventilation outlet based on distance of the snapping sound from the ventilation outlet; and
    control the air flow through the ventilation outlet based on the ventilation outlet control data to change the direction of the air flow and to change the at least one of the spread of the air flow or the intensity of the air flow from the ventilation outlet.

2. The vehicle ventilation control system according to claim 1, further comprising a second microphone and a third microphone, each configured to detect sound.

3. The vehicle ventilation control system according to claim 2, wherein the first microphone, the second microphone and the third microphone are connected to the processing circuitry and are configured to detect the same sound.

4. The vehicle ventilation control system according to claim 3, wherein the processing circuitry is configured to determine the position of the sound by a triangulation operation by comparing a first time when the snapping sound is detected by the first microphone with a second time when the snapping sound is detected by the second microphone and with a third time when the snapping sound is detected by the third microphone.

5. The vehicle ventilation control system according to claim 1, wherein the ventilation control system further comprises a ventilation outlet control unit configured to mechanically change operation of the ventilation outlet to change the direction of the air flow and change the at least one of the spread of the air flow or the intensity of the air flow from the ventilation outlet in response to receipt of the ventilation outlet control data from the processing circuitry.

6. A method for managing an air flow from a ventilation outlet in a vehicle, the method comprising:
 identifying a snapping sound made by a single snap of a vehicle occupant's fingers, and determining a position of the snapping sound relative to the ventilation outlet;
 determining a ventilation outlet control data based on the position of the snapping sound, wherein the determination of the ventilation outlet control data and the determination of the position of the snapping sound is based on the identified snapping sound, and wherein the ventilation outlet control data includes control data to control a direction of the air flow and to control at least one of a spread of the air flow or an intensity of the air flow from the ventilation outlet based on distance of the snapping sound from the ventilation outlet; and
 controlling the air flow through the ventilation outlet based on the ventilation outlet control data to change the direction of the air flow and to change at least one of the spread of the air flow or the intensity of the air flow from the ventilation outlet.

* * * * *